(12) United States Patent
Van Lunteren

(10) Patent No.: US 12,443,891 B2
(45) Date of Patent: Oct. 14, 2025

(54) VECTOR PROCESSING OF DECISION TREES TO FORM INFERENCES

(71) Applicant: International Business Machines Corporation, Armonk, NY (US)

(72) Inventor: Jan Van Lunteren, Rüschlikon (CH)

(73) Assignee: International Business Machines Corporation, Armonk, NY (US)

( * ) Notice: Subject to any disclaimer, the term of this patent is extended or adjusted under 35 U.S.C. 154(b) by 1019 days.

(21) Appl. No.: 17/445,888

(22) Filed: Aug. 25, 2021

(65) Prior Publication Data

US 2023/0068120 A1    Mar. 2, 2023

(51) Int. Cl.
| | |
|---|---|
| *G06N 20/20* | (2019.01) |
| *G06F 9/30* | (2018.01) |
| *G06F 9/38* | (2018.01) |

(52) U.S. Cl.
CPC ......... *G06N 20/20* (2019.01); *G06F 9/30029* (2013.01); *G06F 9/30036* (2013.01); *G06F 9/30098* (2013.01); *G06F 9/3887* (2013.01); *G06F 9/3888* (2023.08)

(58) Field of Classification Search
CPC ...... G06N 20/20; G06N 20/00; G06F 9/3888; G06F 9/3885; G06F 9/38; G06F 9/30029; G06F 9/30036; G06F 9/30007; G06F 9/30098; G06F 9/3887
USPC .......................................................... 706/12
See application file for complete search history.

(56) References Cited

U.S. PATENT DOCUMENTS

| | | | |
|---|---|---|---|
| 5,870,735 A | 2/1999 | Agrawal et al. | |
| 2003/0176931 A1* | 9/2003 | Pednault | G06N 7/01 |
| | | | 700/44 |
| 2006/0190465 A1* | 8/2006 | Nakano | G06F 16/322 |
| 2008/0010304 A1* | 1/2008 | Vempala | G06F 16/355 |
| 2013/0185239 A1 | 7/2013 | Dedeoglu et al. | |
| 2013/0297613 A1* | 11/2013 | Yu | G06F 16/9027 |
| | | | 707/E17.014 |
| 2015/0032674 A1* | 1/2015 | Cichosz | G06N 20/00 |
| | | | 706/12 |

(Continued)

OTHER PUBLICATIONS

Lettich et al., "Parallel Traversal of Large Ensembles of Decision Trees", IEEE Transactions on Parallel and Distributed Systems, vol. 30, Issue: 9, 2019, pp. 2075-2089. (Year: 2019).*

(Continued)

*Primary Examiner* — Hwei-Min Lu
(74) *Attorney, Agent, or Firm* — Kelsey M. Skodje

(57) ABSTRACT

A method and computer program product for performing machine learning inferences are disclosed. A set of input records to be processed by decision trees is selected, and the decision trees are run. Running the decision trees includes identifying operations to be performed as matrix elements, wherein the matrix elements correspond to the input records. Running the decision trees also includes using vector processing to process disjoint subsets of the matrix elements based on vector instructions operating on data stored in vector registers, such that the matrix elements of each subset of the disjoint subsets are processed in parallel. All leaf nodes of each decision tree involved are processed as split (Continued)

nodes looping to themselves until a termination condition is met. The termination condition is met if at least one of the leaf nodes has been reached for each of the decision trees involved.

20 Claims, 8 Drawing Sheets

(56) References Cited

U.S. PATENT DOCUMENTS

| | | | |
|---|---|---|---|
| 2015/0032680 A1* | 1/2015 | Cichosz | G06N 5/04 |
| | | | 706/50 |
| 2015/0262064 A1 | 9/2015 | Burger et al. | |
| 2018/0217991 A1* | 8/2018 | Dato | G06F 16/24578 |
| 2018/0260427 A1* | 9/2018 | Khadiwala | G06F 16/27 |
| 2019/0005115 A1* | 1/2019 | Warrier | G06F 18/24147 |
| 2019/0197141 A1* | 6/2019 | Gomez | G06F 3/0482 |
| 2019/0213685 A1* | 7/2019 | Ironside | G06F 18/214 |
| 2021/0150372 A1* | 5/2021 | Jiang | G06F 18/24765 |
| 2022/0318641 A1* | 10/2022 | Carreira-Perpiñán | |
| | | | G06N 20/20 |

OTHER PUBLICATIONS

Ettich et al., "Parallel Traversal of Large Ensembles of Decision Trees," https://ieeexplore.ieee.org/abstract/document/8430583, IEEE Transactions on Parallel and Distributed Systems, Sep. 2019, 15 pgs.

Marron et al., "Low-latency Multi-threaded Ensemble Learning for Dynamic Big Data Streams," https://upcommons.upc.edu/bitstream/handle/2117/120515/Low-latency+Multi-threaded+Ensemble+Learning+for+Dynamic+Big+Data+Streams.pdf;jsessionid=D56D0CFC086DFF07A69945469BC99F66?sequence=1, IEEE International Conference on Big Data, Dec. 2017, 10 pgs.

Mell et al., "The NIST Definition of Cloud Computing," Recommendations of the National Institute of Standards and Technology, U.S. Department of Commerce, Special Publication 800-145, Sep. 2011, 7 pgs.

Owaida et al., "Scalable Inference of Decision Tree Ensembles: Flexible Design for CPU-FPGA Platforms," https://fpl2017.elis.ugent.be/media/public/papers/179_Paper.pdf, 27th International Conference on Field Programmable Logic and Applications (FPL), Sep. 2017, 8 pgs.

Tracy II, T. "Accelerating Decision Tree Ensemble Inference with an Automata Representation," https://libraetd.lib.virginia.edu/public_view/m3011852, Aug. 2019, 140 pgs.

Van Lunteren et al., "Accelerating Decision Tree Inferences," U.S. Appl. No. 17/347,918, filed Jul. 15, 2021.

Van Lunteren et al., "Accelerating Inferences Performed By Ensemble Models of Base Learners," U.S. Appl. No. 17/376,223, filed Jul. 15, 2021.

Van Lunteren et al., "Joint Execution of Decision Tree Nodes for Accelerating Inferences," U.S. Appl. No. 17/127,104, filed Dec. 18, 2020.

Zeuch, et al., "Adapting Tree Structures for Processing with SIMD Instructions," https://openproceedings.org/2014/conf/edbt/ZeuchFH14.pdf, Proc. 17th International Conference on Extending Database Technology (EDBT), Mar. 24-28, 2014, 12 pgs.

* cited by examiner

301 ↴

| Decision DT# | DT1 | DT2 | DT3 | DT4 | DT5 | DT6 | DT7 | DT8 |
|---|---|---|---|---|---|---|---|---|
| Input record # | | | | | | | | |
| IR1 | $a_{11}$ | $a_{12}$ | $a_{13}$ | $a_{14}$ | $a_{15}$ | $a_{16}$ | $a_{17}$ | $a_{18}$ |
| IR2 | $a_{21}$ | $a_{22}$ | $a_{23}$ | $a_{24}$ | $a_{25}$ | $a_{26}$ | $a_{27}$ | $a_{28}$ |
| IR3 | $a_{31}$ | $a_{32}$ | $a_{33}$ | $a_{34}$ | $a_{35}$ | $a_{36}$ | $a_{37}$ | $a_{38}$ |
| IR4 | $a_{41}$ | $a_{42}$ | $a_{43}$ | $a_{44}$ | $a_{45}$ | $a_{46}$ | $a_{47}$ | $a_{48}$ |
| IR5 | $a_{51}$ | $a_{52}$ | $a_{53}$ | $a_{54}$ | $a_{55}$ | $a_{56}$ | $a_{57}$ | $a_{58}$ |
| IR6 | $a_{61}$ | $a_{62}$ | $a_{63}$ | $a_{64}$ | $a_{65}$ | $a_{66}$ | $a_{67}$ | $a_{68}$ |
| IR7 | $a_{71}$ | $a_{72}$ | $a_{73}$ | $a_{74}$ | $a_{75}$ | $a_{76}$ | $a_{77}$ | $a_{78}$ |
| IR8 | $a_{81}$ | $a_{82}$ | $a_{83}$ | $a_{84}$ | $a_{85}$ | $a_{86}$ | $a_{87}$ | $a_{88}$ |

| Decision DT# | DT1 | DT2 | DT3 | DT4 | DT5 | DT6 | DT7 | DT8 |
|---|---|---|---|---|---|---|---|---|
| Input record # | | | | | | | | |
| IR1 | $a_{11}$ | $a_{12}$ | $a_{13}$ | $a_{14}$ | $a_{15}$ | $a_{16}$ | $a_{17}$ | $a_{18}$ |
| IR2 | $a_{21}$ | $a_{22}$ | $a_{23}$ | $a_{24}$ | $a_{25}$ | $a_{26}$ | $a_{27}$ | $a_{28}$ |
| IR3 | $a_{31}$ | $a_{32}$ | $a_{33}$ | $a_{34}$ | $a_{35}$ | $a_{36}$ | $a_{37}$ | $a_{38}$ |
| IR4 | $a_{41}$ | $a_{42}$ | $a_{43}$ | $a_{44}$ | $a_{45}$ | $a_{46}$ | $a_{47}$ | $a_{48}$ |
| IR5 | $a_{51}$ | $a_{52}$ | $a_{53}$ | $a_{54}$ | $a_{55}$ | $a_{56}$ | $a_{57}$ | $a_{58}$ |
| IR6 | $a_{61}$ | $a_{62}$ | $a_{63}$ | $a_{64}$ | $a_{65}$ | $a_{66}$ | $a_{67}$ | $a_{68}$ |
| IR7 | $a_{71}$ | $a_{72}$ | $a_{73}$ | $a_{74}$ | $a_{75}$ | $a_{76}$ | $a_{77}$ | $a_{78}$ |
| IR8 | $a_{81}$ | $a_{82}$ | $a_{83}$ | $a_{84}$ | $a_{85}$ | $a_{86}$ | $a_{87}$ | $a_{88}$ |

FIG. 3B

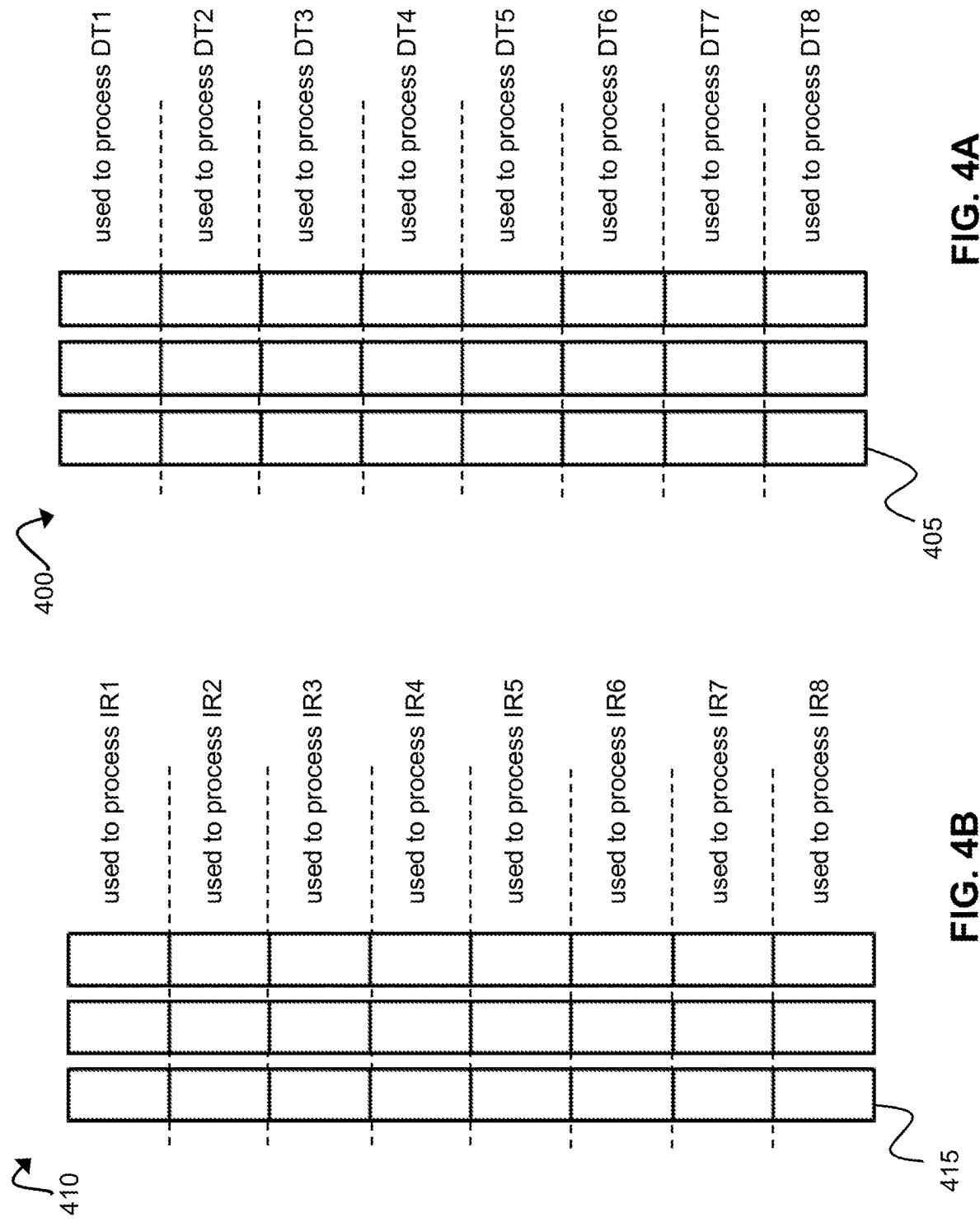

VECTOR PROCESSING OF DECISION TREES TO FORM INFERENCES

BACKGROUND

The present disclosure relates to performing machine learning inferences and, more specifically, to processing decision trees.

Decision tree learning is a predictive modeling approach used in machine learning. It relies on one or more decision trees, forming the predictive model. Different types of decision trees are known, including classification trees and regression trees. A binary decision tree is a structure involving coupled decision processes. Starting from the root, a feature is evaluated, and one of the two branches of the root node is selected. This procedure is repeated until a leaf node is reached, a value of which is used to form a final result.

SUMMARY

Various embodiments are directed to a computer-implemented method of performing machine learning inferences. The method includes selecting a set of input records to be processed by decision trees, running the decision trees. Running the decision trees includes identifying operations to be performed as matrix elements, wherein the matrix elements correspond to the input records. Running the decision trees also includes using vector processing to process disjoint subsets of the matrix elements based on vector instructions operating on data stored in vector registers, such that the matrix elements of each subset of the disjoint subsets are processed in parallel. All leaf nodes of each decision tree involved in each subset are processed as split nodes looping to themselves until a termination condition is met for all the decision trees involved in each subset. The termination condition is met if at least one of the leaf nodes has been reached for each of the decision trees involved. In some embodiments, the decision trees are decision trees of an ensemble model. Running the decision trees can include monitoring a current node identifier of each decision tree and repeatedly evaluating a termination condition for each decision tree according to outcomes of the monitoring with a view to evaluating the termination condition for all the decision trees involved in each subset.

In some embodiments, each of the subsets of the matrix elements corresponds to a respective one of the input records to be processed by several of the decision trees or corresponds to several of the input records to be processed by a respective one of the decision trees. In some embodiments, each of the disjoint subsets of the matrix elements corresponds to a first number of the input records to be processed by a second number of the decision trees. For each of one or more of the disjoint subsets, a smaller one of the first number and the second number can be larger than or equal to one, and a larger one of the first number and the second number can be larger than or equal to two. In these instances, the method can include determining both the first number and the second number for each of the disjoint subsets based on characteristics of the matrix elements and/or a computerized system used to perform the machine learning inferences. Based on the characteristics, the first number and/or the second number may be modified. In some embodiments, the matrix elements are accessed on the fly, as needed to process the matrix elements of the disjoint subsets. The method can also include, prior to processing the matrix elements, determining a partition of the disjoint subsets based on characteristics of the matrix elements and/or computerized system for performing the machine learning inferences.

In some embodiments, the disjoint subsets of matrix elements are processed using multiprocessing and/or multithreading, where two or more of the disjoint subsets are being concurrently processed at a given point in time. The method can also include, prior to this processing, a first maximal number, which is a maximal number of disjoint subsets that can be concurrently processed using multiprocessing and/or multithreading based on characteristics of one or each of the matrix elements and a computerized system used to perform the machine learning inferences. The first maximal number may be determined using a cognitive model trained based on the characteristics. Additionally, prior to the processing, a second maximal number can be determined, where the second maximal number is a maximal number of matrix elements that can be processed in parallel in each of the disjoint subsets using vector processing. While running the decision trees, the first and/or second maximal numbers may be modified based on the characteristics.

Additional embodiments are directed to a system and a computer program product, which includes a computer readable storage medium having program instructions embodied therewith, the program instructions executable by a processor to cause a device to perform the method.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIGS. 3A and 3B are schematic diagrams illustrating possible partitions of matrix elements of a matrix, according to some embodiments of the present disclosure.

FIGS. 4A and 4B are schematic diagrams illustrating data mapping onto vector registers, according to some embodiments of the present disclosure.

Figure 1:
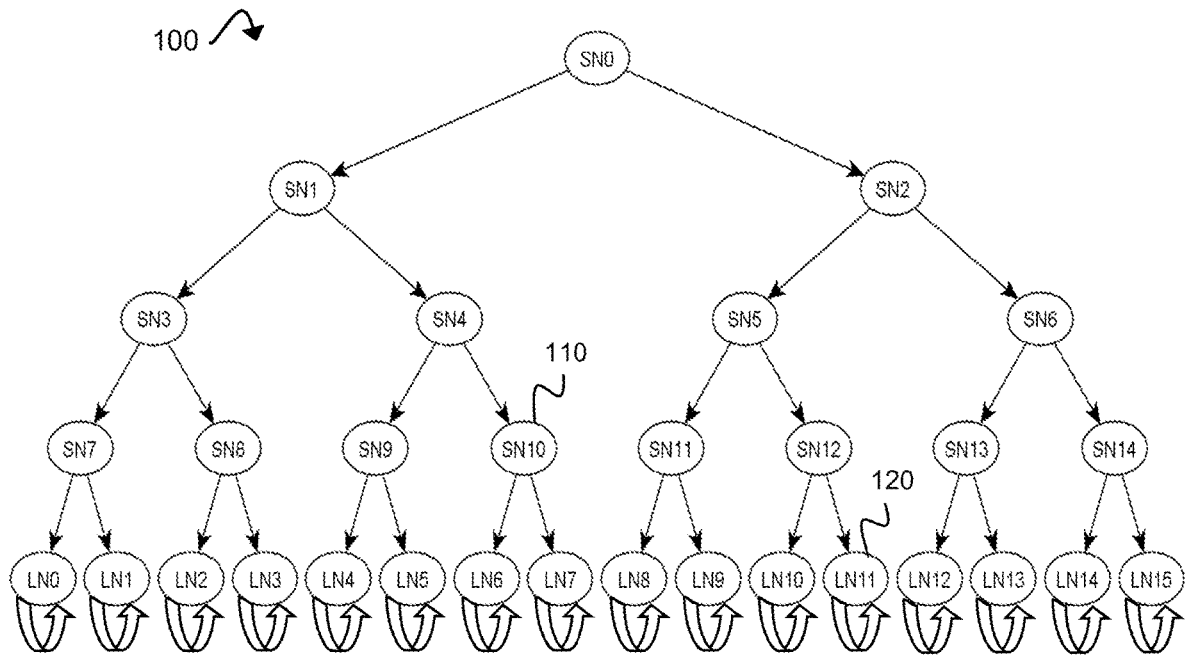
FIG. 1 is a schematic diagram illustrating decision trees including split nodes and leaf nodes, according to some embodiments of the present disclosure.

While the invention is amenable to various modifications and alternative forms, specifics thereof have been shown by way of example in the drawings, and will be described in detail. It should be understood, however, that the intention is not to limit the invention to the particular embodiments described. Instead, the intention is to cover all modifications, equivalents, and alternatives falling within the spirit and scope of the invention.

DETAILED DESCRIPTION

Decision tree learning is a predictive modeling approach used in machine learning. It relies on one or more decision trees, forming the predictive model. Decision trees are widely used machine learning algorithms, owing to their simplicity and interpretability. Different types of decision trees are known, including classification trees and regression trees. A binary decision tree is a structure involving coupled decision processes. Starting from the root, a feature is evaluated, and one of the two branches of the root node is selected. This procedure is repeated until a leaf node is reached, a value of which is used to form a final result.

Random forest and gradient boosting are important machine learning methods, which are based on binary decision trees. In such methods, multiple decision trees are "walked" in parallel until leaf nodes are reached. The results taken from the leaf nodes are then averaged (regression) or used in a majority vote (classification). Such computations can be time (and resources) consuming, resulting in a need to accelerate tree-based inferences. For this purpose, one may consider using vector processing. However, the algorithms typically used to execute the decision trees do not optimally exploit vector registers.

Disclosed herein are techniques for improving the processing of decision trees using vector instructions. The disclosed techniques can adaptively exploit vector instructions, as well as multithreading and/or multiprocessing, to further accelerate tree-based inferences. The decision trees, which may form part of an ensemble model, can process input records. The input records and the decision trees can be represented as a matrix. Each matrix element of this matrix corresponds to one of the input records to be processed by one of the decision trees, and the decision trees can be run by processing the matrix elements. Disjoint subsets of the matrix elements can be processed using vector processing based on vector instructions operating on data stored in vector registers. As a result, the matrix elements of each subset of the disjoint subsets can be processed in parallel. In order to enable a systematic processing of the matrix elements, all leaf nodes of each decision tree (of all the decision trees involved in each subset) can be processed as split nodes looping to themselves. They can do so until a termination condition is met for all the decision trees involved in each subset. This termination condition can be designed in such a manner that it is met if at least one of the leaf nodes has been reached for each of all the decision trees involved in each subset.

As a result of the leaf nodes looping to themselves, the processing of any decision tree involved in each disjoint subset of matrix elements may not end when a leaf node is reached, but simply continue as if the leaf nodes were split nodes being processed over and over again. These loops can continue until the termination condition is met. Because of this feature, the processing of the matrix elements within a subset can be performed in lockstep using the same vector instructions, which can improve the efficiency of the process. All the more, the proposed approach makes it possible to implement vector processing simply and systematically and, thus, take full advantage of parallel processing using vector instructions. This also allows deeper trees to be parallelized, e.g., using single instruction, multiple data (SIMD) instructions. The vectorization scheme can notably involve a same input record processed across several decision trees and/or different input records across a same tree (or a few trees), depending on the partition chosen for the disjoint subsets. Note, the matrix may not need to be loaded beforehand. Rather, it may be sufficient to access the matrix elements (load them for processing) on the fly as needed to process the matrix elements of the disjoint subsets.

In embodiments, a termination condition is independently evaluated for each decision tree involved in each subset in order to evaluate a global termination condition at the subset level. This can include monitoring a current node identifier of each decision tree and repeatedly evaluating a termination condition for each decision tree according to outcomes of the monitoring, with a view to evaluating the termination condition for all the decision trees involved in each sub set.

Each subset of the matrix elements may correspond to a respective input record, which is to be processed by several decision trees of the decision trees. In variants, each subset of the matrix elements corresponds to several of the input records, which are to be processed by a respective one of the decision trees. Further, each of the disjoint subsets of the matrix elements may correspond to a first number of the input records to be processed by a second number of the decision trees. One of these numbers can be strictly larger than that of at least one of the disjoint subsets, or possibly for each of the subsets. That is, for each of one or more of the disjoint subsets, a smaller one of the first number and the second number can larger than or equal to one, whereas a larger one of the first number and the second number can be larger than or equal to two.

In embodiments, the first number and the second number can be determined for each of the disjoint subsets based on characteristics of the matrix elements and/or a computerized system used to perform the machine learning inferences. Note, the first number and/or the second number may be modified, if necessary, based on said characteristics. This modification may occur prior to performing the inferences or while performing such inferences, provided that such characteristics are adequately monitored, or somehow estimated.

In some embodiments, an adequate partition of the disjoint subsets of the matrix elements can be determined prior to processing the matrix elements of the disjoint subsets, based on characteristics of the matrix elements and/or the underlying computerized system.

In some embodiments, vector instructions can be used together with multithreading and/or multiprocessing to accelerate tree-based inferences. This can allow the disjoint subsets of matrix elements to be processed using one or each of multiprocessing and multithreading. Therefore, two or more of the disjoint subsets can be concurrently processed, at least at a given point in time, if not at all times, in addition to the multiple matrix elements being processed in parallel.

In these instances, a first maximal number can be determined prior to concurrently processing the disjoint subsets of matrix elements. The first maximal number can be a maximal number of disjoint subsets that can be concurrently processed using one or each of multiprocessing and multithreading, based on characteristics of one or each of the matrix elements and a computerized system used to perform the machine learning inferences. In some embodiments, a second maximal number can also be determined prior to concurrently processing the disjoint subsets of matrix elements. The second maximal number can be a maximal number of matrix elements that can be processed in parallel in each of the disjoint subsets using vector processing. This number too may be determined according to characteristics such as evoked above. Note, any or each of the first maximal number and the second maximal number may possibly be determined using a cognitive model trained based on such characteristics. In embodiments, the first maximal number and/or second maximal number can be modified while running the decision trees. Again, such characteristics may be timely estimated or adequately monitored, e.g., while running the decision trees.

Accelerating tree-based inferences in ensemble models (e.g., random forest and gradient boosting models) can typically be achieved by speeding up either (i) the individual binary decision tree processing, and/or (ii) the parallel processing of multiple binary decision trees and/or multiple input records. Examples herein focus on the second approach, although embodiments address the first approach as well.

Figure 5:
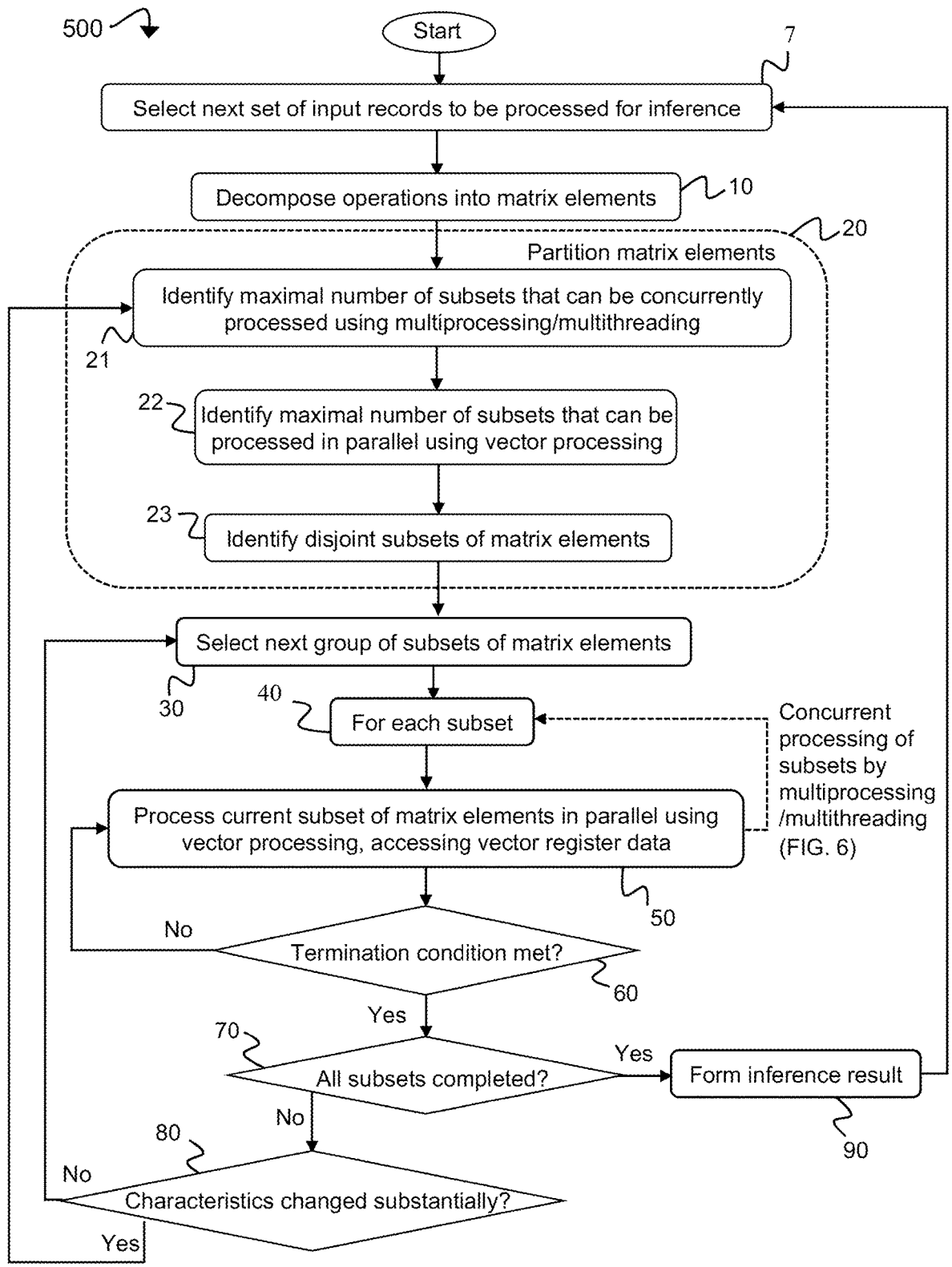
FIG. 5 is a flow diagram illustrating a process of performing machine learning inferences, according to some embodiments of the present disclosure.

With reference to FIGS. 1-5, a first aspect of the invention is now described in detail, which concerns a computer-implemented method of accelerating decision tree inferences. Note, this method and its variants are collectively referred to as the "present methods" in this document. Method steps are illustrated in FIG. 5 (steps 7-90) and FIG. 6 (steps 51-54). The aim of this method can be to perform machine learning inferences using decision trees 100 such as shown in FIG. 1. The accompanying drawings show simplified representations of devices or parts thereof, as involved in embodiments. Similar or functionally similar elements in the figures have been allocated the same numeral references, unless otherwise indicated.

FIG. 1 is a schematic diagram illustrating decision trees 100, according to some embodiments of the present disclosure. Each tree 100 comprises nodes 110, 120, which include split nodes 110 and leaf nodes 120. In this example, the split nodes 110 are denoted by references SN0 (corresponding to the root node) to SN14, while the leaf nodes 120 are denoted by references LN0 to LN15. Each split node 110 can include at least two child nodes. In practice, the decision trees may typically all be binary trees, in which case each split node 110 gives rise to exactly two child nodes, as in FIG. 1. Such a decision tree can be executed as follows: starting from the root, a feature is evaluated, and one of the two branches of the root node is selected. This procedure is repeated until a leaf node 120 is reached, a value of which is used to form a final result.

To that aim, use can be made of attributes of the nodes; such attributes include operands that are required to execute the nodes. These attributes may, for instance, include feature identifiers (also called feature selectors), thresholds used for comparisons, and, more generally, all arguments needed for evaluating the rules captured by the decision tree nodes. Each split node of a decision tree is labelled with a feature identifier and is associated with a threshold to perform an operation. For example, a feature value corresponding to a feature identifier can be compared to a threshold, as known per se. This is illustrated in FIG. 2.

Figure 2:
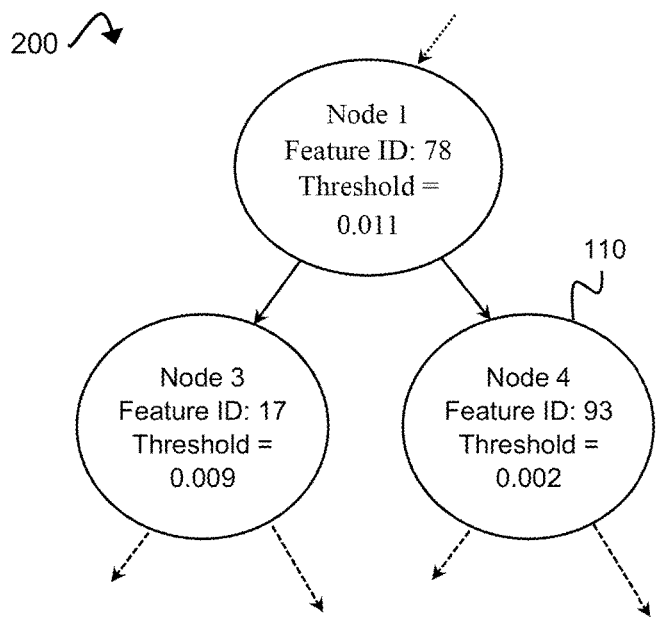
FIG. 2 is a schematic diagram illustrating a selection of connected nodes of a decision tree, together with feature identifiers and threshold values of the nodes as used to execute such nodes, according to some embodiments of the present disclosure.

FIG. 2 is a schematic diagram 200 illustrating a selection of connected nodes 110 of the decision tree 100 (FIG. 1), together with respective feature identifier values ("Feature ID") and threshold values of the nodes as used to execute such nodes, according to some embodiments of the present disclosure.

Consistent with tree-based inference methods, the present methods can include accessing input records (e.g., test data or inference data), which are fed to the decision trees 100 for execution of the latter, with a view to forming an inference result, e.g., a classification or a regression. The decision trees 100 are assumed to have already been trained based on training data. Running the decision trees 100 can cause an inference result to form for each tree, based on an outcome of executing the nodes 110, 120. In some embodiments, several decision trees can be executed, which preferably form part of an ensemble model such as a random forest or a gradient boosting model. Thus, a global result may eventually be constructed based on inference results obtained from each decision tree, e.g., for classification or regression purposes.

In some embodiments, the present methods use vector processing to parallelize the computations as much as possible. This assumes that the underlying computerized system includes one or more vector processing (e.g., single instruction, multiple data instructions, also known as SIMD instructions) units as part of its central processing unit (CPU). These units can implement instructions that are designed, during the programming phase, to operate on one-dimensional arrays of data (the "vectors"), in contrast to scalar instructions.

FIGS. 3A and 3B are schematic diagrams 301 and 302 illustrating possible partitions of matrix elements of a matrix, according to some embodiments of the present disclosure. In the illustrated examples, each matrix element corresponds to one input record (IR) to be processed by one decision tree (DT). In FIG. 3A, the matrix elements 301 are partitioned row-wise; each input record is to be processed, in parallel, by each of the eight decision trees involved in this example, using vector processing. In FIG. 3B, the matrix elements 302 are partitioned column-wise: each decision tree is to be run, in parallel, for each of the eight input records involved, using vector processing. Other types of partitions may be contemplated.

FIGS. 4A and 4B are schematic diagrams 400 and 410 illustrating data mapping onto vector registers 405 and 415, respectively, according to some embodiments of the present disclosure. In some embodiments, mapping data onto vector registers 405, 415 can accelerate inferences. FIG. 4A shows a mapping that is suited for a partition as in FIG. 3A, while FIG. 4B depicts a mapping suited for the partition shown in FIG. 3B.

Because, in the present context, the kind of parallelism enabled by vector processing can be achieved on both the multiple input records and/or the various decision trees involved, it can be useful to represent the problem at issue as a matrix. Consider a matrix A, which is a collection of matrix elements $a_{ij}$ that correspond, each, to one input record IR1 . . . IRn to be processed by one decision tree DT1 . . . DTm, as illustrated in FIGS. 3A and 3B. In these examples, n=m=8, for simplicity. It is noted that the values of n and m are typically much larger (and not necessarily equal) in practice.

Each matrix element $a_{ij}$ may have to be computed, in order to eventually form (step 90, FIG. 5) an inference result, unless a specific approach is used, where, e.g., computations are interrupted early if a convergence is detected.

Figure 6:
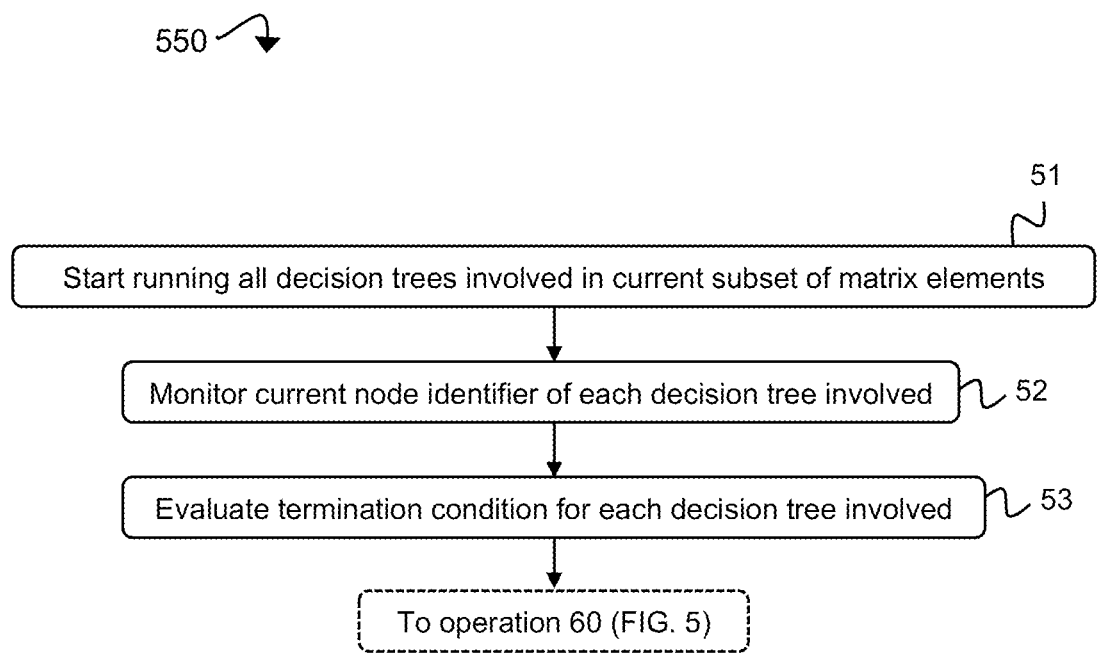
FIG. 6 is a flow diagram illustrating a process of monitoring decision trees to evaluate whether a termination condition is met, according to some embodiments of the present disclosure.

FIGS. 5 and 6 are flow diagrams illustrating processes 500 and 550 of performing machine learning inferences, according to some embodiments of the present disclosure.

Given a matrix representation of the input records and the decision trees, the present methods aim at running (steps 30-60 in FIG. 5) the decision trees by processing (step 50) each of the matrix elements $a_{ij}$. This means that each decision tree $DT_j$ can be executed based on each of the input records $IR_i$ that is fed to it, in view of achieving a result provided by a leaf node 120 of each of the decision trees 100. Such results can then be averaged (as in regressions) or used in a majority vote (as in classifications). Note, the matrix need not necessarily be formed and loaded beforehand. Rather, the matrix elements may be accessed when needed, on the fly, or right in time for processing the matrix elements at step 50.

Instead of executing the matrix elements one after the other, the present methods can rely on disjoint subsets of the matrix elements, where the matrix elements of each subset are executed in parallel, using vector processing. In some embodiments, the subsets do not overlap and can form a full partition of the matrix elements. That is, the matrix elements can be partitioned into nonoverlapping subsets (sublists) of such elements. Then, for each disjoint subset, the matrix elements of this subset can be processed 50 using vector processing, based on vector instructions that operate on data stored in vector registers 405, 415 (see FIGS. 4A and 4B). Depending on the type of partition chosen, the vector registers 405, 415 may include attributes of the nodes and/or input data extracted from the input records, as illustrated in FIGS. 4A and 4B. Because of the vector processing, each of the disjoint subsets can be processed 50 in parallel.

In order to systematically enable an efficient vector processing of the matrix elements, the leaf nodes 120 of each of the decision trees 100 involved in each subset can be processed 50 as split nodes looping to themselves, as symbolically depicted in FIG. 1. That is, the present methods can indefinitely consider such nodes as split nodes until a suitable termination condition is met (60: Yes).

This termination condition can concern all the decision trees that are involved in each subset. More precisely, for a given subset of the matrix elements that are being processed at step 50, the present methods can determine that the termination condition is met at step 60 if at least one of the leaf nodes 120 has been reached for each of all the decision trees involved in this given subset. The present methods can apply the same procedure to each of the distinct subsets of matrix elements (step 40). Such disjoint subsets may possibly be successively processed. Preferably though, several subsets are concurrently processed because of the multiprocessing and/or multithreading approaches that may be exploited on top of vector processing, as in embodiments discussed later.

In some embodiments, vector processing architectures known to those of ordinary skill in the art are used. The present methods may notably exploit vector instructions (e.g., SIMD instructions) and vector registers that are available in some processors. Using such vector instructions and vector registers, the present methods allow multiple binary decision trees and/or multiple input records to be processed in parallel, as part of machine learning inference operations. That is, vector processing can be exploited to parallelize computations with respect to input records and/or decision trees.

The proposed approach can allow systematic vector processing based on parallel processing using vector instructions. This may allow deeper trees to be parallelized, e.g., using SIMD instructions. For example, a systematic vector processing can be enabled by causing the leaf nodes 120 of each of the decision trees 100 involved in any of the disjoint subset to keep looping to themselves. That is, each leaf node 120 can loop to itself, e.g., using a pointer referring to the same leaf node. As a result of the leaf nodes 120 looping to themselves, the processing of any of the decision trees 100 involved does not end when a leaf node 120 is reached, but simply continues as if the leaf nodes 120 were split nodes being processed over and over again. These infinite loops continue until the termination condition is met, e.g., until it can be established (step 60) that a leaf node 120 has been reached in each of the decision trees 100 involved in the subset that is currently being processed. Therefore, processing of the matrix elements within a same subset may be performed in lockstep using the same vector instructions.

As per the design of the termination condition involved at step 60, when this condition is met, all the decision trees 100 processed in parallel at step 50 (in any of the subsets of matrix elements) have reached a termination, in which case vector processing can be stopped. This way, an implementation is enabled in which the decision trees of any subset of the matrix elements are systematically processed, in parallel, using vector processing, because the same instructions/data can be used for all of the decision trees/input records involved in this subset.

Referring to FIG. 6, a termination condition can be independently evaluated for each of the decision trees involved in the processing 50 of a given subset of the matrix elements. A global termination condition can then be evaluated (step 60) with respect to all the decision trees involved. Note, the global termination condition may possibly be repeatedly evaluated, concomitantly with the termination conditions that are independently evaluated for each tree. That is, when processing 50 elements of a given subset, the method 550 may start running 51 all decision trees involved in this subset and monitor 52 current node identifiers in each of these decision trees, as they are being executed. Based on this monitoring, the method can repeatedly evaluate 53 a termination condition for each decision tree 100 involved, as this decision tree is being executed. The aim is to subsequently (or concomitantly) evaluate 60 the global termination condition for all of the decision trees 100 involved in this subset.

One may for example register and test the difference in current node identifiers (or node offsets) between successive processing steps for each decision tree, based on the corresponding vector register as used to store those identifiers or offsets. This can, for instance, be done by a subtract or XOR operation. When the current node identifiers or offsets do not change anymore (the difference is zero for a given decision tree), this means that a leaf node has been reached for this decision tree. In that case, the execution of this decision tree can be stopped, and the processing results (e.g., labels) that are stored in the relevant leaf node can be retrieved from the decision tree structure, e.g., from values encoded inside the replacement split nodes or at a specific/consecutive location in memory. Other approaches can be contemplated to track the current states of each decision tree involved in each subset.

As evoked earlier, the vectorization scheme can involve a same input record, which is processed across several decision trees and/or different input records which are processed across a same tree (or a few trees), depending on the partition chosen. For example, when processing eight decision trees in parallel, one may use the same input records on eight different decision trees of the ensemble, as assumed in FIG. 3A. In that case, each of the matrix elements (of a given subset) corresponds to a respective input record, which is to be processed by several decision trees 100. The same approach can be applied to all of the disjoint subsets of matrix elements. For example, multiple decision trees can be processed in parallel by storing and processing the relevant parameters (including the current node identifiers or offsets, the thresholds for the current nodes, and so on). That is, such decision trees can be processed together by exploiting vector registers. In some embodiments, the current node identifiers (for the multiple trees involved in a given subset) are stored in one vector register, the thresholds for the current nodes in the multiple trees are stored in another vector register, and so on, as assumed in FIG. 4A. The multiple trees involved can thus be processed in parallel using the parameters stored in the vector registers 405 by continuously repeating the steps needed to process a split node. These do not stop when a leaf node is reached as leaf nodes loop to themselves until the termination condition is met.

Conversely, multiple input records may be processed in parallel through one decision tree, as illustrated in FIGS. 3B and 4B. In these embodiments, for a given subset, each matrix element can correspond to several of the input records to be processed by a respective decision tree, as reflected in the column-wise partition of the matrix shown in FIG. 3B. And, again, the same approach may possibly be applied to all of the disjoint subsets of matrix elements. For example, processing a given subset may cause it to run eight times the same decision tree, such as against eight different input records (rows), as seen in FIGS. 3B and 4B.

FIGS. 3A and 3B can assume simple partitions, such as the row-wise or column-wise partitions of FIGS. 3A and 3B. However, more sophisticated partitions can be contemplated, as long as these span the matrix elements intended to be computed. In particular, the present methods may seek to determine 23 a most suitable partition of the matrix elements, which can be a most appropriate fragmentation of the matrix elements resulting in disjoint subsets of the matrix elements. For example, a hybrid approach may result in using consecutive subsets of vector registers to process: (i) IR1 with DT1; (ii) IR1 with DT2; (iii) IR1 with DT3; (iv) IR1 with DT4; (v) IR2 with DT1; (vi) IR2 with DT2; (vii) IR2 with DT3; and (viii) IR2 with DT4, instead of processing a same input records with DT1 to DT8 (as in FIG. 4A) or processing IR1 to IR8 with a same decision tree (as in FIG. 4B).

Which type of partition is suitable can depend on various parameters, e.g., including characteristics of the matrix elements and/or the computerized system used to perform the inferences. The characteristics of the computerized system (starting with the number of vector registers available) can play a determinant role.

For example, if there are only one or very few input records, then a row-wise partitioning as in FIG. 3A may result in the best performance. However, if the ensemble model involves only one or a few decision trees, then a column-wise partitioning as in FIG. 3B may result in the best performance. These examples of partitioning schemes can make it possible to utilize (fill) the entire capacity (width) of the vector registers. If there are many decision trees and many input records, then the best partitioning may also depend on the size of the decision trees, the size of an input record, and the size of the caches. For example, if a single decision tree has a very large size, and the processor cache(s) is (are) not large enough to store the most frequently accessed parts of multiple decision trees at the same time, then processing multiple decision trees in parallel may result in degraded cache performance due to the so-called "cache trashing". In the latter case, it may be more advantageous to use a partitioning as in FIG. 3B because in that case only one decision tree is involved in the vector processing of a subset of the matrix elements, instead of eight decision trees for processing a subset of matrix elements according to a partitioning as in FIG. 3A. A similar reasoning can be applied to the size of the input records. For example, some data sets and corresponding input records may happen to involve only a few features, e.g., 18 or 28 features, whereas other data sets may possibly give rise to input records involving up to millions of features. As will be understood by persons of ordinary skill, given the variety of potential scenarios, it may be appropriate to use a cognitive model to decide on the best partitioning strategy, instead of using a conventional rule-based approach, as in embodiments discussed below.

The operation at step 23 may be done once for all, prior to starting the processing 50 of the matrix elements of the disjoint subsets. In variants, the partition of the matrix elements may be dynamically changed, depending on a current state of the computations performed. To that aim, one may monitor characteristics of the data being processed, especially when data pertaining to the matrix elements are loaded on the fly. Based on the data characteristics observed in real-time, it may be found to be more efficient to change the partition scheme, e.g., switching from FIG. 3A to 3B or to a hybrid option. Various heuristics can be contemplated to that aim. For example, a cognitive classification model can be trained based on data aggregated from sample matrix elements and then used to dynamically decide which partition to choose.

Thus, the disjoint subsets may end up having various shapes and sizes; they do not necessarily need to gather neighboring matrix elements. In general, each of the disjoint subsets will correspond to a number $n_1$ of input records, which are to be processed by a number $m_2$ of decision trees, where, for each disjoint subset, $\min(n_1, m_2) \geq 1$, while $\max(n_1, m_2) \geq 2$. Still, the few last subsets or the very last subset to be processed may only include one matrix element (or a few elements), this depending on the partition chosen with respect to the multiple input records and decision trees, where this partition may possibly be dynamically and adaptively changed. Alternatively, the residual matrix elements (falling outside an optimal partition) may be processed at the beginning of a job. Such residual matrix elements may thus be processed in a non-vectorized way. In other variants, one may pad incomplete subsets (using padding) to fill unused parallel processing capacity. In such cases, dummy records and trees may be relied on, which can be designed to be neutral so that they do not impact the final result.

The operation performed at step 23 may aim at determining the most appropriate numbers $n_1$ and $m_2$ for each of the disjoint subsets, based on parameters as mentioned earlier. Such parameters may include characteristics of the matrix elements (e.g., characteristics of the input records and the decision trees) and/or the computerized system 700 (e.g., number of vector registers and vector register sizes of a vector processing (e.g., SIMD) unit). Such numbers may be determined at runtime, e.g., using a trained cognitive model, where this model has been previously trained based on examples of such characteristics and corresponding labels. Doing so may lead to processing any suitable number of input records through any suitable number of decision trees. Additionally, such numbers $n_1$, $m_2$ may further be modified 23, at runtime, based on monitored characteristics, should these characteristics happen to change substantially (80: Yes). If so, then the process loops back to step 20 (e.g., to step 21, which will be described further below, or even directly to step 23), prior to selecting 30 and loading a next subset (or group of subsets) of matrix elements for subsequent processing 50.

In particular, one may want to determine an optimal ratio of such numbers, for a given ensemble model, on a given computer system having a given load, and so on. The optimal ratio may be obtained using a cognitive model trained on offline-collected information, e.g., obtained by experiments performed with the various options and models.

For example, for each trained ensemble model and for a given input dataset, a set of conditions may be identified, which will be used to determine (dynamically during runtime) which partition to use. Those conditions might be added to a databank for future use. These conditions may include the inference batch size as a key parameter, though additional parameters (such as the system load and cache sizes) can be included too.

As noted earlier, several sources of parallelism can be used, e.g., on the one hand, vector processing and, on the other hand, multiprocessing and/or multithreading. Therefore, at all times, a subset of the matrix elements are being processed in parallel, using vector processing, while several of such subsets may possibly be processed concurrently using multiprocessing and/or multithreading. As a result, disjoint subsets of matrix elements may be concurrently processed 40-50 using multiprocessing and/or multithreading. This means that two or more of the disjoint subsets may be concurrently processed at a given point in time, or even at any point in time if the partition and the selection (as made at steps 23 and 30, respectively) permit. Yet, at the end of a job, only one subset remains to be processed.

In some embodiments, not only the processing of matrix elements can be parallelized within a same subset via vector processing, but also the processing of several subsets can be concurrently performed via multiprocessing and/or multithreading. Multiprocessing can be used with vector processing, assuming that some of the processors involved include vector processing (e.g., SIMD) units.

To that aim, at step 21, a maximal number (call it a first maximal number) of disjoint subsets that can be concurrently processed using multiprocessing or multithreading is identified. In some embodiments, two maximal numbers may be determined at step 21. One of these numbers can correspond to a maximal number of disjoint subsets that can be concurrently processed on all vector processing or SIMD units available (for multiprocessing purposes). The other one of these numbers can correspond to the maximal number of disjoint subsets that can be concurrently processed on each vector processing or SIMD unit with multithreading. Step 21 can, for instance, be performed, once for all, prior to concurrently processing 50 any group of disjoint subsets of matrix elements using multiprocessing and/or multithreading. Step 21 may further be repeatedly performed, dynamically, should the monitored characteristics substantially change (80: Yes). The number(s) determined at step 21 can be determined based on characteristics of the matrix elements and the computerized system.

Such characteristics may include:
I. Concerning the ensemble model parameters:
   a. The number of trees in the ensemble;
   b. The maximum depth of the trees;
   c. The number of nodes in the trees (relates to the sparseness of trees); and
   d. Related to all of the above, the total size of tree ensemble data structure in bytes;
II. Concerning the platform/implementation parameters:
   a. The vector register width;
   b. The cache sizes, the cache line width; and
   c. The number of threads available for prediction (affects multi-threading), and/or,
III. Concerning the predict request parameters, the batch size and input record size (number of features).

Similarly, the method may further include determining 22 a maximal number (call it a second maximal number) of matrix elements that can be processed in parallel in each of the disjoint subsets, by way of vector processing. Step 22 can be performed prior to starting to process 50 the matrix elements, as seen in FIG. 5. Again, this number may be determined using characteristics such as listed above, e.g., using a simple heuristic or a cognitive model, which is trained based on examples of such characteristics. Preferably, each of the first and second maximal numbers is determined 21 based on a cognitive model.

And again, such numbers may be adaptively modified at runtime, based on evolving characteristics. Making use of such numbers, it is also possible to dynamically orchestrate between the various types of parallelism involved, in order to further optimize the inference operations, as in embodiments. That is, the extent to which multithreading/multiprocessing and vectorization are being exploited can be dynamically orchestrated. Indeed, vector instructions and multithreading can be exploited in various ways, and the selection of the best way for a given situation may depend on several parameters, such as the batch size used in a predict operation, the characteristics of the ensemble model (e.g., model size, access characteristics, the sizes of the caches in the underlying computer system, and the current load of the system).

Referring to FIG. 5, an example flow of operations (process 500) is illustrated according to some embodiments. A set of input records can be selected at step 7 to be processed for inferences, based on an ensemble model of several decision trees. The various operations to be performed can be identified as matrix elements at step 10; the matrix is not loaded yet. One matrix element corresponds to one input record to be processed by a respective tree. The matrix elements are then partitioned at step 20, based on matrix element indexes of the matrix, to identify disjoint subsets of the matrix elements. In particular, the preprocessing performed at step 20 may include identifying (step 21) a first maximal number (or first maximal numbers) of subsets that can be concurrently processed using multiprocessing and/or multithreading. Similarly, step 22 identifies a second maximal number of matrix elements that can be processed in parallel using vector processing. The disjoint subsets of matrix elements are then determined at step 23, notably based on outcomes of steps 21 and 22. A group of subsets of the matrix elements is selected at step 30; the corresponding data are accessed and loaded in memory for subsequent processing. The matrix elements of each loaded subset (see step 40) are processed 50 in parallel using vector processing. This requires accessing data from vector registers. Still, multiple subsets can be concurrently processed with multiprocessing and/or multithreading, as denoted by the arrow looping back to step 40. At step 60, it is tested whether the termination condition is met for all decision trees, which typically requires to evaluate whether a termination condition is met for each tree, individually (see steps 51, 52, and 53 in FIG. 6). The processing 50 continues as long as the termination condition is not met (60: No). If the termination condition is met (step 60: Yes) for all of the decision trees involved in a current subset, the process goes to step 70, which tests whether the processing of all subsets has completed. If so (70: Yes), then an inference result is formed at step 90. From this point on, another set of input records may be selected 7, together with a new model, if necessary. If not (70: No), the process may test whether the current characteristics of the matrix elements (input records and decision trees) have sufficiently changed, as this may advantageously change the way in which computations are performed. If so (80: Yes, meaning that the current characteristics have substantially changed), then the algorithm goes back to step 21, with a view to determining 23 a new partition of the matrix elements that remain to be processed. If not (80: No, meaning that no substantial change is observed in the monitored characteristics), then the algorithm goes back to step 30, where it selects a further group of subsets of matrix elements for parallel and concurrent processing 50 using vector processing and multiprocessing and/or multithreading.

Some embodiments involve a simple node structure for the binary decision trees, in which each node comprises four elements: a feature selector, a threshold, a pointer to a left child node (serving as node identifier), and a pointer to a right child node (serving as node identifier). Split nodes in a binary decision tree can be mapped using this node structure, by storing the feature selectors, thresholds, and pointers to the left and right child nodes in the corresponding elements in the corresponding nodes. Leaf nodes may be mapped using this node structure by storing a pointer to the node itself in both the elements holding the pointers to the left and right child nodes, in the corresponding nodes. The leaf label (the result associated with the leaf node) may be stored in the threshold element of the corresponding nodes. For completeness, some randomly selected valid feature selector (e.g., a feature selector selecting the first feature of an input record) may be stored in the feature selector element of the corresponding nodes. In this way, a leaf node will loop to itself, regardless of the value of the threshold element, because the pointers to both child nodes refer to the node itself.

By monitoring if the current node identifier (the pointer to the node currently being processed) remains the same, it can be determined if a leaf node has been reached. This can be done by applying a simple subtract or XOR (exclusive or) operation using the previous and current values of the node identifier as operand values. If the result equals zero, then a leaf node has been reached. Testing if leaf nodes have been reached, as described above, for all trees involved in the processing of a subset of matrix element can be done using vector processing or SIMD instructions.

Moreover, some embodiments use improved mechanisms to efficiently use SIMD resources, in particular fixed-sized vector registers of 256-bit or 512-bit width, by allowing various types of operations to be performed at the maximum parallelism based on their data type width. For example, where node identifiers are represented by 16-bit integer values and threshold and feature values are represented by 32-bit floating-point values, then 256-bit wide vector registers can be used to store and process 16 node identifiers in parallel, and/or 8 threshold and feature values in parallel. Using multiple combinations of two vector registers, a total of 16 threshold and feature values can be stored and processed, while logical and shift instructions can be used to transform and reduce the 512-bit wide processing result into a 256-bit wide vector that can be used for processing and updating the 16 node identifiers stored within a single 256-bit wide vector register.

Figure 7:
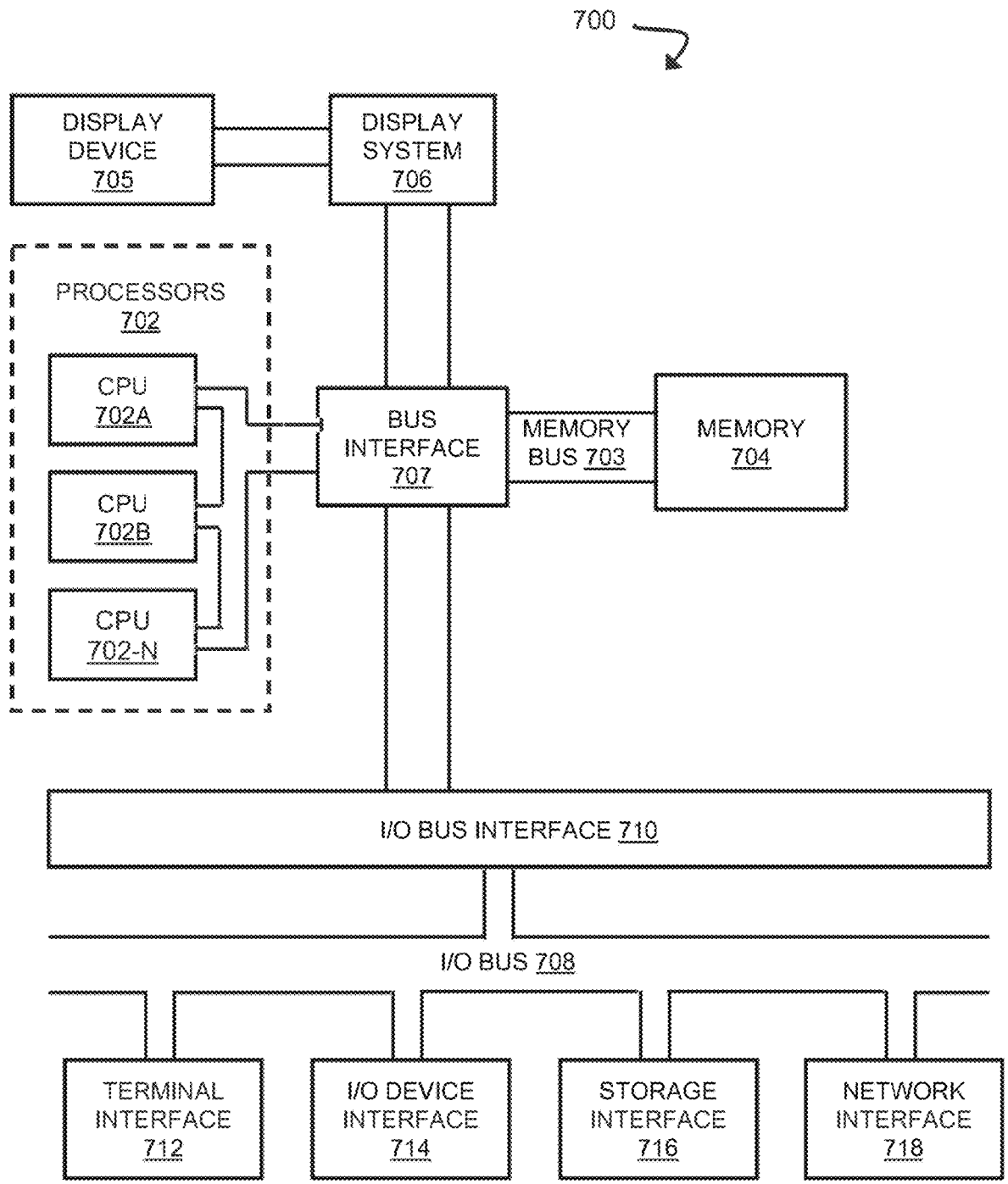
FIG. 7 is a block diagram illustrating a computer system, according to some embodiments of the present disclosure.

FIG. 7 is a block diagram illustrating an exemplary computer system 700 that can be used in implementing one or more of the methods, tools, components, and any related functions described herein (e.g., using one or more processor circuits or computer processors of the computer). In some embodiments, the major components of the computer system 700 comprise one or more processors 702, a memory subsystem 704, a terminal interface 712, a storage interface 716, an input/output device interface 714, and a network interface 718, all of which can be communicatively coupled, directly or indirectly, for inter-component communication via a memory bus 703, an input/output bus 708, bus interface unit 707, and an input/output bus interface unit 710.

The computer system 700 contains one or more general-purpose programmable central processing units (CPUs) 702A, 702B, and 702-N, herein collectively referred to as the CPU 702. In some embodiments, the computer system 700 contains multiple processors typical of a relatively large system; however, in other embodiments the computer system 700 can alternatively be a single CPU system. Each CPU 702 may execute instructions stored in the memory subsystem 704 and can include one or more levels of on-board cache.

The memory 704 can include a random-access semiconductor memory, storage device, or storage medium (either volatile or non-volatile) for storing or encoding data and programs. In some embodiments, the memory 704 represents the entire virtual memory of the computer system 700 and may also include the virtual memory of other computer systems coupled to the computer system 700 or connected via a network. The memory 704 is conceptually a single monolithic entity, but in other embodiments the memory 704 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures.

In an embodiment, the memory 704 includes instructions that execute on the processor 702 or instructions that are interpreted by instructions that execute on the processor 702 to carry out the functions as further described in this disclosure. In another embodiment, the instructions are implemented in hardware via semiconductor devices, chips, logical gates, circuits, circuit cards, and/or other physical hardware devices in lieu of, or in addition to, a processor-based system. In another embodiment, the memory 704 includes data in addition to instructions.

Although the memory bus 703 is shown in FIG. 7 as a single bus structure providing a direct communication path among the CPUs 702, the memory subsystem 704, the display system 706, the bus interface 707, and the input/output bus interface 710, the memory bus 703 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 710 and the input/output bus 708 are shown as single respective units, the computer system 700 may, in some embodiments, contain multiple input/output bus interface units 710, multiple input/output buses 708, or both. Further, while multiple input/output interface units are shown, which separate the input/output bus 708 from various communications paths running to the various input/output devices, in other embodiments some or all of the input/output devices may be connected directly to one or more system input/output buses.

The computer system 700 may include a bus interface unit 707 to handle communications among the processor 702, the memory 704, a display system 706, and the input/output bus interface unit 710. The input/output bus interface unit 710 may be coupled with the input/output bus 708 for transferring data to and from the various input/output units. The input/output bus interface unit 710 communicates with multiple input/output interface units 712, 714, 716, and 718, which are also known as input/output processors (IOPs) or input/output adapters (IOAs), through the input/output bus 708. The display system 706 may include a display controller. The display controller may provide visual, audio, or both types of data to a display device 705. The display system 706 may be coupled with a display device 705, such as a standalone display screen, computer monitor, television, or a tablet or handheld device display. In alternate embodiments, one or more of the functions provided by the display system 706 may be on board a processor 702 integrated circuit. In addition, one or more of the functions provided by the bus interface unit 707 may be on board a processor 702 integrated circuit.

In some embodiments, the computer system 700 is a multi-user mainframe computer system, a single-user system, or a server computer or similar device that has little or no direct user interface but receives requests from other computer systems (clients). Further, in some embodiments, the computer system 700 is implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 700. In some embodiments, however, individual components may have greater or lesser complexity than as represented in FIG. 7. Components other than or in addition to those shown in FIG. 7 may be present, and the number, type, and configuration of such components may vary.

In some embodiments, the data storage and retrieval processes described herein could be implemented in a cloud computing environment, which is described below with respect to FIGS. 8 and 9. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher-level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
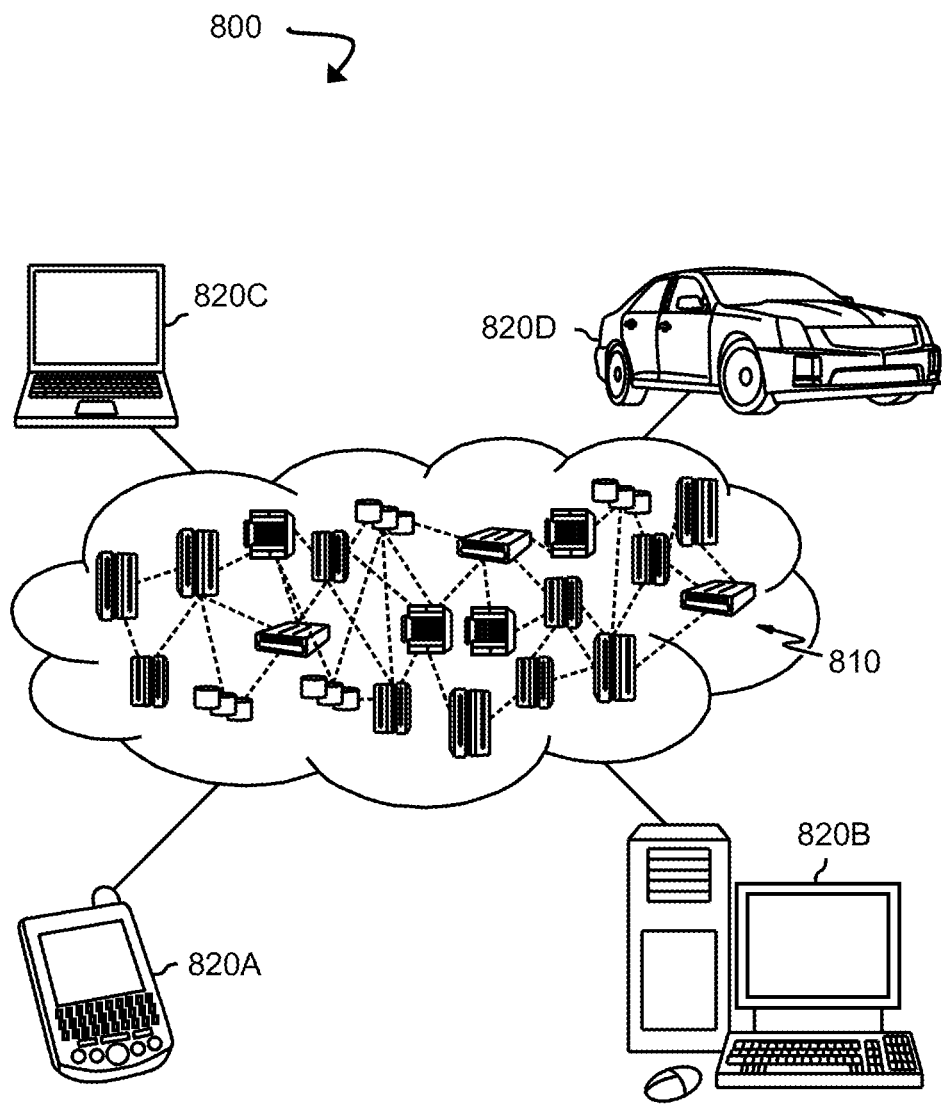
FIG. 8 is a block diagram illustrating a cloud computing environment, according to some embodiments of the present disclosure.

FIG. 8 is a block diagram illustrating a cloud computing environment 800, according to some embodiments of the present disclosure. As shown, cloud computing environment 800 includes one or more cloud computing nodes 810 with which local computing devices used by cloud consumers, such as, for example, personal digital assistant (PDA) or cellular telephone 820A, desktop computer 820B, laptop computer 820C, and/or automobile computer system 820D may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 820A-820D shown in FIG. 8 are intended to be illustrative only and that computing nodes 810 and cloud computing environment 800 can communicate with any type of computerized device over any type of network and/or network addressable connection (e.g., using a web browser).

Figure 9:
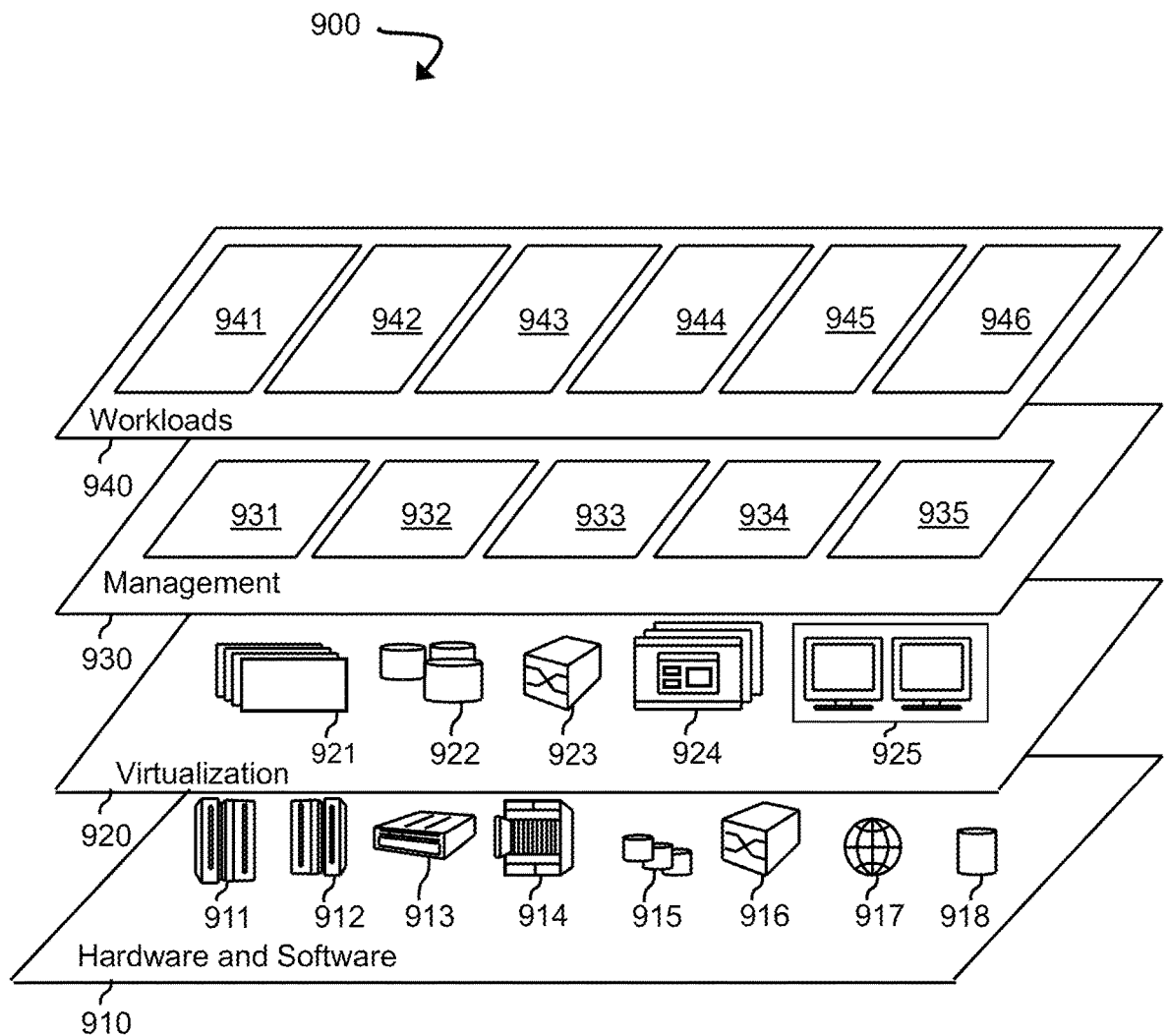
FIG. 9 is a block diagram illustrating a set of functional abstraction model layers provided by the cloud computing environment, according to some embodiments of the present disclosure.

FIG. 9 is a block diagram illustrating a set of functional abstraction model layers 900 provided by the cloud computing environment 800, according to some embodiments of the present disclosure. It should be understood in advance that the components, layers, and functions shown in FIG. 9 are intended to be illustrative only and embodiments of the invention are not limited thereto. As depicted, the following layers and corresponding functions are provided:

Hardware and software layer 910 includes hardware and software components. Examples of hardware components include: mainframes 911; RISC (Reduced Instruction Set Computer) architecture-based servers 912; servers 913; blade servers 914; storage devices 915; and networks and networking components 916. In some embodiments, software components include network application server software 917 and database software 918.

Virtualization layer 920 provides an abstraction layer from which the following examples of virtual entities may be provided: virtual servers 921; virtual storage 922; virtual networks 923, including virtual private networks; virtual applications and operating systems 924; and virtual clients 925.

In one example, management layer 930 provides the functions described below. Resource provisioning 931 provides dynamic procurement of computing resources and other resources that are utilized to perform tasks within the cloud computing environment. Metering and Pricing 932 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 933 provides access to the cloud computing environment for consumers and system administrators. Service level management 934 provides cloud computing resource allocation and management such that required service levels are met. Service Level Agreement (SLA) planning and fulfillment 935 provide pre-arrangement for, and procurement of, cloud computing resources for which a future requirement is anticipated in accordance with an SLA.

Workloads layer 940 provides examples of functionality for which the cloud computing environment can be utilized. Examples of workloads and functions that can be provided from this layer include: mapping and navigation 941; software development and lifecycle management 942; virtual classroom education delivery 943; data analytics processing 944; transaction processing 945; and making machine learning inferences using decision trees 946.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

What is claimed is:

1. A computer-implemented method of performing machine learning inferences, comprising:

monitoring characteristics of a computerized system used to perform the machine learning inferences, the monitored characteristic comprising a number of available vector registers and a current load of the computerized system;

selecting a set of input records to be processed by decision trees on the computerized system;

identifying operations to be performed as matrix elements, wherein the matrix elements correspond, each, to one of the input records to be processed by one of the decision trees;

monitoring characteristics of one or each of the matrix elements;

dynamically partitioning the matrix elements, based on the monitored characteristics of the one or each of the matrix elements and the computerized system used to perform the machine learning inferences, to determine disjoint subsets of the matrix elements; and concurrently processing, by the computerized system, the disjoint subsets of the matrix elements based on the dynamic partitioning, wherein the concurrently processing comprises:

processing a first disjoint subset of the disjoint subsets using vector processing, based on vector instructions operating on data stored in the vector registers, such that the matrix elements of the first disjoint subset are processed in parallel;

determining that at least one leaf node has been reached for at least one of the decision trees involved in the first disjoint subset;

determining whether a termination condition has been met, wherein the termination condition is met when a leaf node has been reached for all of the decision trees involved in the first disjoint subset; and in response to determining that the termination condition has not been met, processing each of the at least one leaf node that has been reached as a split node looping to itself using a pointer until the termination condition is met.

2. The method of claim 1, wherein the concurrently processing further comprises:
monitoring a current node identifier of each decision tree involved in the first disjoint subset; and
repeatedly evaluating the termination condition for the each decision tree according to outcomes of the monitoring the current node identifier, with a view to evaluating the termination condition for all the decision trees involved in the first disjoint subset.

3. The method of claim 1, wherein each of the disjoint subsets of the matrix elements corresponds to a respective one of the input records to be processed by several decision trees of the decision trees.

4. The method of claim 1, wherein each of the disjoint subsets of the matrix elements corresponds to several of the input records to be processed by a respective one of the decision trees.

5. The method of claim 1, wherein:
each of the disjoint subsets of the matrix elements corresponds to a first number of the input records to be processed by a second number of the decision trees; and
for each of one or more of the disjoint subsets a smaller one of the first number and the second number is larger than or equal to one, and a larger one of the first number and the second number is larger than or equal to two.

6. The method of claim 5, wherein the dynamically partitioning comprises determining both the first number and the second number for each of the disjoint subsets based on the monitored characteristics of the one or each of the matrix elements and the computerized system used to perform the machine learning inferences.

7. The method of claim 6, wherein the dynamically partitioning further comprises modifying, based on the monitored characteristics of the one or each of the matrix elements and the computerized system used to perform the machine learning inferences, one or each of the first number and the second number.

8. The method of claim 1, wherein the concurrently processing further comprises accessing the matrix elements on the fly, as needed to process the matrix elements of the disjoint subsets.

9. The method of claim 1, wherein the dynamically partitioning comprises, prior to the concurrently processing the matrix elements of the disjoint subsets, determining a first partition of the disjoint subsets of the matrix elements based on the monitored characteristics of the one or each of the matrix elements and the computerized system used to perform the machine learning inferences.

10. The method of claim 1, wherein the concurrently processing the disjoint subsets of the matrix elements further comprises using one or each of multiprocessing and multithreading at a given point in time.

11. The method of claim 10, wherein the dynamically partitioning comprises: prior to concurrently processing the disjoint subsets of the matrix elements, determining a first maximal number, wherein the first maximal number is a maximal number of disjoint subsets that can be concurrently processed using the one or each of multiprocessing and multithreading, based on the monitored characteristics of the one or each of the matrix elements and the computerized system used to perform the machine learning inferences.

12. The method of claim 11, wherein the dynamically partitioning further comprises: prior to concurrently processing the disjoint subsets of the matrix elements, determining, based on the monitored characteristics of the one or each of the matrix elements and the computerized system used to perform the machine learning inferences, a second maximal number, wherein the second maximal number is a maximal number of matrix elements that can be processed in parallel in each of the disjoint subsets using the vector processing.

13. The method of claim 12, wherein the concurrently processing further comprises: while running the decision trees, modifying one or each of the first maximal number and the second maximal number based on the monitored characteristics of the one or each of the matrix elements and the computerized system used to perform the machine learning inferences.

14. The method of claim 13, wherein the dynamically partitioning further comprises monitoring the characteristics of the one or each of the matrix elements and the computerized system used to perform the machine learning inferences while running the decision trees.

15. The method of claim 1, wherein the decision trees are decision trees of an ensemble model.

16. The method of claim 1, wherein the concurrently processing the disjoint subsets further comprises processing at least one additional disjoint subset using multiprocessing and/or multithreading.

17. The method of claim 1, wherein the monitored characteristics of the computerized system further comprise a size of caches in the computerized system.

18. A system comprising:
a memory; and
a processor communicatively coupled to the memory, wherein the processor is configured to perform a method of performing machine learning inferences, the method comprising:
monitoring characteristics of a computerized system used to perform the machine learning inferences, the monitored characteristic comprising a number of available vector registers and a current load of the computerized system;
selecting a set of input records to be processed on the computerized system based on an ensemble model of several decision trees;
identifying operations to be performed as matrix elements, wherein the matrix elements correspond, each, to one of the input records to be processed by one of the decision trees;
monitoring characteristics of one or each of the matrix elements;
dynamically partitioning the matrix elements, based on the monitored characteristics of the one or each of the matrix elements and the computerized system used to perform the machine learning inferences, to determine disjoint subsets of the matrix elements; and
concurrently processing, by the computerized system, the disjoint subsets of the matrix elements based on the dynamic partitioning, wherein the concurrently processing comprises:
processing a first disjoint subset of the disjoint subsets using vector processing, based on vector instructions operating on data stored in the vector registers, such that the matrix elements of the first disjoint subset are processed in parallel;
determining that at least one leaf node has been reached for at least one of the decision trees involved in the first disjoint subset;
determining whether a termination condition has been met, wherein the termination condition is met when a leaf node has been reached for all of the decision trees involved in the first disjoint subset; and in response to determining that the termination condition has not been met, processing each of the at least one leaf node that has been reached as a split node looping to itself using a pointer until the termination condition is met.

19. A computer program product, the computer program product comprising a computer readable storage medium having program instructions embodied therewith, the program instructions executable by a processor to cause a device to perform a method of performing machine learning inferences, the method comprising:

monitoring characteristics of a computerized system used to perform the machine learning inferences, the monitored characteristic comprising a number of available vector registers and a current load of the device;

selecting a set of input records to be processed on the computerized system based on an ensemble model of several decision trees;

identifying operations to be performed as matrix elements, wherein the matrix elements correspond, each, to one of the input records to be processed by one of the decision trees;

monitoring characteristics of one or each of the matrix elements;

dynamically partitioning the matrix elements, based on the monitored characteristics of the one or each of the matrix elements and the computerized system used to perform the machine learning inferences, to determine disjoint subsets of the matrix elements; and concurrently processing, by the computerized system, the disjoint subsets of the matrix elements based on the dynamic partitioning, wherein the concurrently processing comprises:

processing a first disjoint subset of the disjoint subsets using vector processing, based on vector instructions operating on data stored in the vector registers, such that the matrix elements of the first disjoint subset are processed in parallel;

determining that at least one leaf node has been reached for at least one of the decision trees involved in the first disjoint subset;

determining whether a termination condition has been met, wherein the termination condition is met when a leaf node has been reached for all of the decision trees involved in the first disjoint subset; and in response to determining that the termination condition has not been met, processing each of the at least one leaf node that has been reached as a split node looping to itself using a pointer until the termination condition is met.

20. The computer program product of claim 19, wherein:

each of the disjoint subsets of the matrix elements corresponds to a first number of the input records to be processed by a second number of the decision trees;

for each of one or more of the disjoint subsets a smaller one of the first number and the second number is larger than or equal to one, and a larger one of the first number and the second number is larger than or equal to two; and the method further comprises determining, prior to processing, both the first number and the second number for each of the disjoint subsets based on the monitored characteristics of the one or each of the matrix elements and the computerized system used to perform the machine learning inferences.

\* \* \* \* \*